E. H. SCHUR.
CUSHION WHEEL.
APPLICATION FILED APR. 22, 1913.
1,140,771.
Patented May 25, 1915.
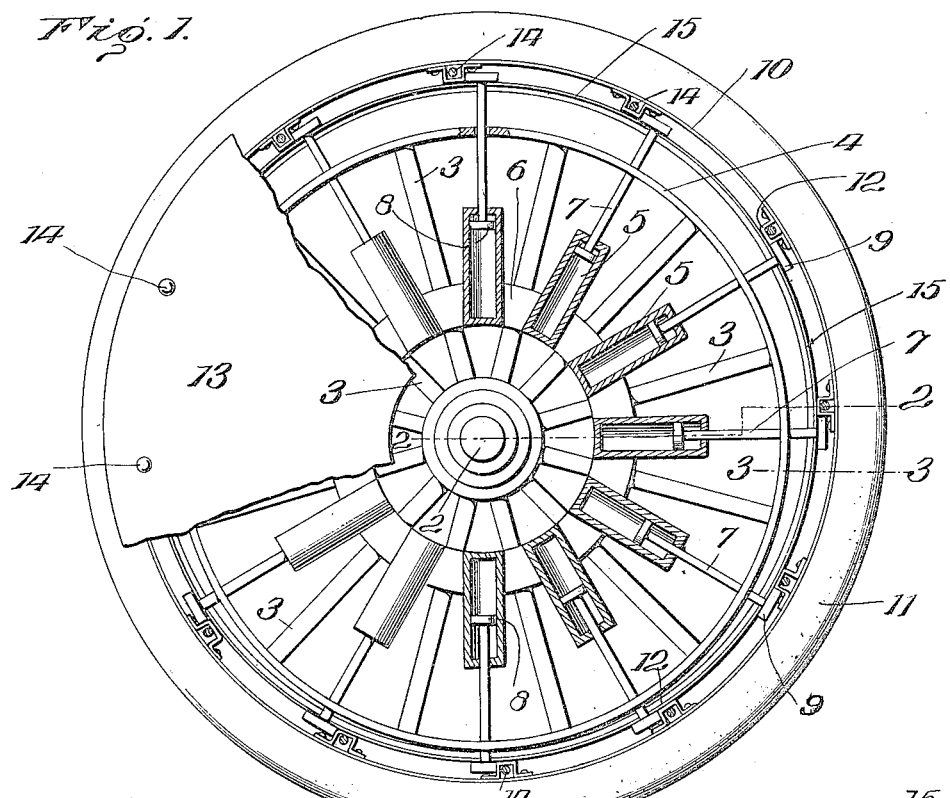
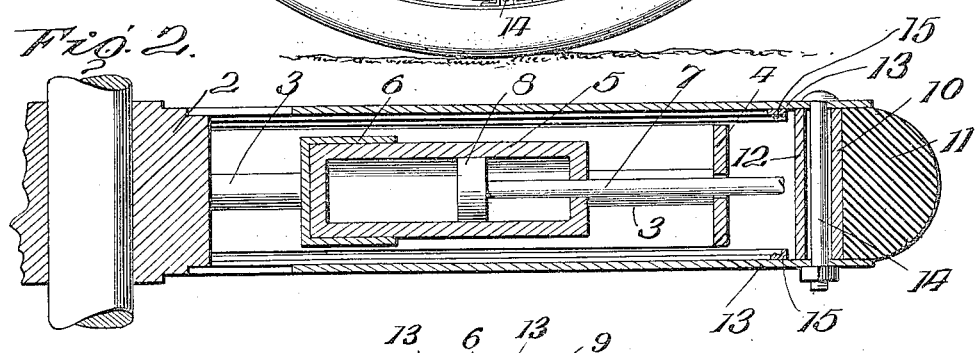
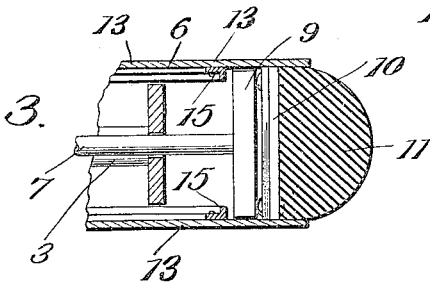
Inventor
E. H. Schur.

UNITED STATES PATENT OFFICE.

EARNEST H. SCHUR, OF HIBBING, MINNESOTA, ASSIGNOR OF ONE-FOURTH TO MORITZ KELLER AND ONE-FOURTH TO BAILEY KELLER, BOTH OF HIBBING, MINNESOTA.

CUSHION-WHEEL.

1,140,771.

Specification of Letters Patent. Patented May 25, 1915.

Application filed April 22, 1913. Serial No. 762,957.

*To all whom it may concern:*

Be it known that I, EARNEST H. SCHUR, citizen of the United States, residing at Hibbing, in the county of St. Louis and State of Minnesota, have invented certain new and useful Improvements in Cushion-Wheels, of which the following is a specification.

My invention relates to vehicle wheels and more particularly to cushion wheels of that type in which a plurality of spokes are used, the spokes acting as pistons and engaging with cushioning cylinders carried upon the central or hub section of the wheel.

The primary object of my invention is to provide a very simple and effective wheel of this character particularly adapted to automobiles and designed to do away with the necessity of using pneumatic tires.

Another object of the invention is to provide a wheel of this character in which very simple means is provided for permitting the cushioning spokes which are carried by the hub section of the wheel to have free inward and outward movement of the felly or outer section of the wheel and to permit the outer section of the wheel to have a certain lateral play.

A further object is to provide in combination with the wheel having a series of air cylinders or cushions and a series of piston spokes extending out to the rim of the wheel, guides for the piston spokes carried by the rim of the wheel and holding the piston spokes in proper relation thereto and drawing the spokes outward or permitting them to move inward as the wheel rotates.

My invention is illustrated in the accompanying drawings wherein:

Figure 1 is a side elevation of a wheel constructed in accordance with my invention, the face plate being partly broken away to show the internal construction. Fig. 2 is an enlarged section on the line 2—2 of Fig. 1. Fig. 3 is a fragmentary section on the line 3—3 of Fig. 1.

Corresponding and like parts are referred to in the following description and indicated in all the views of the accompanying drawings by the same reference characters.

Referring to these drawings, it will be seen that my improved wheel comprises a hub 2 of any suitable character provided with radiating spokes 3. These spokes at their ends are connected to a rim 4 which extends entirely around the wheel concentric to the hub. This rim 4, the hub 2 and the spokes 3 may be constructed in any suitable manner and I do not wish to limit myself to the use of spokes and the rim 4.

Disposed between each pair of spokes 3 is an air cylinder 5. These cylinders may be connected to the hub structure in any suitable manner and as shown are connected by means of a web 6 with each other and with the spokes 3 whereby the cylinders are held in properly spaced radiating position. Passing through the rim 4 are a plurality of piston spokes constituting piston rods and designated 7, each piston spoke carrying at its end an inner head 8 operating a corresponding cylinder 5. The outer end of each piston spoke 7 is formed as illustrated in Fig. 3 with a transversely extending cross bar 9.

Surrounding the hub section of the wheel (which hub section includes the central portion of the hub proper, the spokes 3 and the guide rim 4) is an outer rim or felly designated 10 and adapted to receive upon it the tire or tread 11. This rim is formed with a plurality of transversely extending hollow abutments designated 12. These are spaced at regular distances from each other.

Disposed on each side of the rim 10 are the annular face plates 13 which are formed each at its margin with a plurality of openings for the passage of bolts 14 which pass through the hollow abutments 12 and connect the side plates to each other.

Each of the face plates 13 is formed with an inwardly projecting annular flange or ledge 15 which when the face plates are in place upon the rim extends just within the hollow abutments 12 and in contact therewith. The cross bars 9 of the piston spokes 7 engage over these opposed ledges or flanges 15, and each cross bar is disposed between two abutments 12. Each cross bar, therefore, has free movement circumferentially between these abutments but it will be obvious that each cross bar and its corresponding spoke will be moved out or in with relation to the axis of the hub with the rim.

The operation of the invention is therefore as follows: Under the weight of a load upon the axle of the car the hub portion of the wheel will be depressed and the hub portion will take an eccentric position relative to the rim. As a consequence, the uppermost spokes will be extended as illustrated in Fig. 1, the downwardly extending spokes will be compressed, that is, the pistons will be forced into the cylinders so that the air in the cylinders will cushion the pistons, and the laterally extending spokes will be drawn out to correspond. Inasmuch as the spokes can shift between the abutments, it is obvious that the laterally extending spokes will not be affected by the eccentric movement of the rim, this eccentric movement being relatively small and not being greater than the depth of the abutments 12.

A cushion wheel constructed in accordance with my invention is very simple, may be cheaply made, the parts may be easily assembled and it is capable of securing a very effective cushioning action.

Power is transmitted from the hub portion of the wheel, through the spokes to the abutments 12 and thus to the rim in case the wheel is used as a driving wheel, and where the wheel is used simply as a traction wheel it is obvious that the abutments will transmit the movement of the rim to the hub by engagement with the spokes.

What I claim is:

A cushion wheel including a hub, an inner rim, rigid spokes connecting the hub and the inner rim, an annular web providing a channel mounted upon said rigid spokes adjacent their inner extremities and concentric to the hub, cushioning cylinders disposed between each pair of rigid spokes, each of said cylinders seating at one extremity within the channel of said web, a series of piston spokes projecting radially from the opposite extremities of said cylinders and passing loosely through the inner rim, said spokes each including a piston head within the cylinder, the outer extremity of each of said spokes being formed with a transversely extending cross bar, an outer rim, a series of circumferentially spaced hollow abutments secured to the inner face of the outer rim, opposed annular side plates seating against the sides of the outer rim and extending over said web, bolts passing through said side plates and through said abutments and holding the said plates to the outer rim, and annular inwardly extending oppositely disposed ledges formed on the said side plates adjacent the outer margins thereof, the said ledges being disposed immediately inward of the abutments and arranged to engage said cross bars, the said cross bars being mounted to move freely upon said ledges between the abutments.

In testimony whereof I affix my signature in presence of two witnesses.

EARNEST H. SCHUR.

Witnesses:
T. F. COREY,
JOHN KORIO.

Copies of this patent may be obtained for five cents each, by addressing the "Commissioner of Patents, Washington, D. C."